(12) United States Patent
Fitz et al.

(10) Patent No.: US 7,213,694 B2
(45) Date of Patent: *May 8, 2007

(54) ONE-WAY DRIVE DEVICE WITH REDUCED ENGAGEMENT IMPACT

(75) Inventors: Frank A. Fitz, Poway, CA (US); Wayne K. Higashi, Los Gatos, CA (US); Paul B Pires, Ben Lomond, CA (US); Stephen C. Shear, Lafayette, CO (US)

(73) Assignee: EXP, L.P., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/126,855

(22) Filed: May 10, 2005

(65) Prior Publication Data

US 2005/0199465 A1    Sep. 15, 2005

Related U.S. Application Data

(63) Continuation of application No. 10/118,041, filed on Apr. 5, 2002, now Pat. No. 6,896,111.

(51) Int. Cl.
*F16D 41/12* (2006.01)

(52) U.S. Cl. .................. 192/46; 192/52.6; 192/69.1

(58) Field of Classification Search .................. None
See application file for complete search history.

(56) References Cited

U.S. PATENT DOCUMENTS

| | | | |
|---|---|---|---|
| 2,719,619 A | 10/1955 | McClellan et al. | |
| 3,010,699 A | 11/1961 | McKay | |
| 3,043,157 A | 7/1962 | Wollar | |
| 3,340,972 A | 9/1967 | Burkland et al. | |
| 3,589,486 A * | 6/1971 | Kelch | 192/46 |
| 4,768,295 A | 9/1988 | Ito | |
| 5,070,978 A | 12/1991 | Pires | |
| 5,509,172 A | 4/1996 | Lauro | |
| 5,597,057 A | 1/1997 | Ruth et al. | |
| 5,678,668 A | 10/1997 | Sink | |
| 5,806,643 A | 9/1998 | Fitz | |
| 5,829,565 A | 11/1998 | Fergle et al. | |
| 5,857,552 A | 1/1999 | Hashimoto | |
| 5,871,071 A | 2/1999 | Sink | |
| 5,872,497 A | 2/1999 | Yerkovich et al. | |
| 5,918,715 A | 7/1999 | Ruth et al. | |
| 5,937,980 A | 8/1999 | Dick | |
| 5,964,331 A | 10/1999 | Reed et al. | |
| 5,971,122 A | 10/1999 | Costin et al. | |
| 5,979,627 A | 11/1999 | Ruth et al. | |
| 6,065,576 A | 5/2000 | Shaw et al. | |
| 6,089,112 A | 7/2000 | Kelly et al. | |
| 6,125,979 A | 10/2000 | Costin et al. | |
| 6,125,980 A | 10/2000 | Ruth et al. | |
| 6,129,190 A | 10/2000 | Reed et al. | |
| 6,186,299 B1 | 2/2001 | Ruth | |
| 6,193,038 B1 | 2/2001 | Scott et al. | |
| 6,206,396 B1 | 3/2001 | Smith | |

\* cited by examiner

FOREIGN PATENT DOCUMENTS

WO    WO 01/12428 A    2/2001

*Primary Examiner*—Rodney H. Bonck
(74) *Attorney, Agent, or Firm*—Pritzkau Patent Group, LLC

(57) ABSTRACT

A drive device includes a first member including a first shoulder, and a second member positioned in close proximity to the first member and including a second shoulder. The device also includes a coupling arrangement including a strut having a first edge for direct engagement with the first shoulder, a second edge for engagement with the second shoulder and supported for pivotal movement between engaged and overrun positions, based on relative rotation of the first and second members such that the first member drives the second member in a drive mode with the strut in the engaged position and the first and second members can overrun with respect to one another with the strut in the overrun position. The coupling arrangement also includes a cushioning member disposed between the second edge and the second shoulder for cushioning each initial engagement of the strut in the drive mode.

13 Claims, 5 Drawing Sheets

ONE-WAY DRIVE DEVICE WITH REDUCED ENGAGEMENT IMPACT

RELATED APPLICATION

The present application is a Continuation of U.S. patent application Ser. No. 10/118,041, now U.S. Pat. No. 6,896,111, entitled ONE-WAY DRIVE DEVICE WITH REDUCED ENGAGEMENT IMPACT, filed on Apr. 5, 2002, which is incorporated herein by reference in its entirety.

BACKGROUND OF THE INVENTION

The present invention relates generally to one-way drive devices and methods of operating such devices and, more specifically, to one-way drive devices in which the engagement impact in the transition from the overrunning mode to the locked mode is reduced.

One-way drive devices join two shafts in such a way that the first shaft drives the second shaft when driven in one direction, but the first shaft disconnects from the second shaft when driven in the opposite direction. An example of a one-way clutch is the type known as a MECHANICAL DIODE® (hereafter referred to as MD) manufactured under license given by Epilogics, Inc. The MD achieves this one-way drive behavior using a high resolution, planar ratchet mechanism. Such a device is disclosed, for instance, in U.S. Pat. No. 5,070,978 issued to Paul B. Pires (hereafter referred to as the Pires patent and incorporated herein by reference).

Turning now to the drawings, wherein like components are indicated by like reference numbers throughout the various figures, attention is immediately directed to FIGS. 1A and 1B, which illustrate the major components of a typical MD of the type disclosed in the Pires patent. FIG. 1A illustrates one face of a pocket plate 10 of an MD mechanism. Pocket plate 10 includes a plurality of indentations 12 for coupling out or in of torque to or from an external shaft (not shown). Pocket plate 10 also includes a plurality of pockets 14, which are configured for housing a plurality of struts 16 therein. Each strut 16 also includes a pair of ears 17 along one edge. Ears 17 are designed to cooperate with a pair of strut locating shoulders 18 of pocket 14 such that strut 16 remains within pocket 14 during the operation of the MD. Another component of a typical MD mechanism is a notch plate 20, illustrated in FIG. 1B, which includes a plurality of notches 22 on one face. When notch plate 20 is positioned in a face-to-face relationship with pocket plate 10 of FIG. 1A, notches 22 are designed cooperate with struts 16 such that one of struts 16 engages one of notches 22 to transfer torque therebetween. It should be noted that torque can be transferred from pocket plate 10 to notch plate 20 via one of struts 16 such that pocket plate 10 drives notch plate 20 or, just as readily, torque can be transferred from notch plate 20 to pocket plate 10 via one of struts 16 such that notch plate 20 drives pocket plate 20.

The details of the operation of the typical MD is further illustrated in FIGS. 2A and 2B, which illustrate partial cross-sectional views of the MD with pocket plate 10 and notch plate 20 arranged in face-to-face relationship. As can be seen in FIGS. 2A and 2B, pocket 14 of pocket plate 10 includes a well 32, which is configured to accommodate a bias spring 32. Bias spring 32 is configured to bias a first edge 34 of strut 16 toward notch plate 20. A second edge 36 of strut 16 is designed such that, as first edge 34 rotates toward notch plate 20, second edge 36 rotates into pocket 14 such that second edge 36 engages a load bearing surface 38 of pocket 14. Each of notches 22 of notch plate 20 includes a slanted surface 40 and a shoulder 42.

The MD in driving mode is shown in FIG. 2A. As can be seen in FIG. 2A, shoulder 42 is configured to cooperate with first edge 34 of strut 16 such that when, for example, notch plate 20 rotates in a driving direction as indicated by arrow 50A, first edge 34 of strut 16 is biased into engagement with shoulder 42. Consequently, torque is transferred from shoulder 42 through first edge 34 and second edge 36 of strut 16 to pocket plate 10 through load bearing surface 38 such that pocket plate 10 is driven in a driven direction indicated by an arrow 52. The direct imposing of strut 16 between notch plate 20 and pocket plate 10 forms a very strong connection between the two plates, thus allowing the transfer of large torques and loads therebetween.

In contrast, the MD in overrunning mode is shown in FIG. 2B. In this case, notch plate 20 rotates in an overrunning direction as indicated by an arrow 50B. Slanted surface 40 of each notch 22 serves to rotate strut 16 toward pocket plate 10 and thus out of engagement with shoulder 42. As a result, notch plate 20 no longer drives pocket plate 10 and the two plates are rotationally disconnected. In other words, in the overrunning mode, pocket plate 10 and notch plate 20 each moves freely with respect to the other plate. Also, ears 17 on strut 16 cooperate with strut locating shoulders to keep strut 16 substantially within pocket 14 during overrunning mode.

Continuing to refer to FIGS. 2A and 2B in conjunction with FIGS. 1A and 1B, one possible problem with the MD type of one-way drive device is a noise or abrupt shock caused during the transition from the overrunning mode to the drive mode. There are thought to be two reasons for the shock or noise present during this operating mode change. The first reason is the positive, surface to surface contact of the strut and plates when in the drive mode, as shown in FIG. 2A. That is, the impact of first edge 34 of strut 16 hitting shoulder 42 of notch plate 20 can result in a noise or shock. A second reason is the angular distance between engagement opportunities (i.e., the angular distance between the opportunities for one of the struts in the pocket plate to engage a shoulder of one of the notches in the notch plate) afforded by the MD design. As most readily seen in FIGS. 1A and 1B, this angular distance can vary from as little as 1- or 2-degrees to as much as 10- to 20-degrees depending on the number and position of struts/pockets and the number of notches used in a specific clutch arrangement. Regardless of this angular distance, the actual reversal of driving direction in the transition from the overrunning mode to the drive mode, if the transition occurs in a random fashion, can occur anywhere within the space between engagement opportunities. On those occasions when the reversal occurs just before an engagement opportunity, i.e., just before a strut is able to engage a shoulder in a notch, the notch plate accelerates in the drive direction from the instant of reversal until the strut becomes fully seated in the previously encountered notch. That is, the notch plate accelerates in the drive direction until the instant of engagement such that, when engagement does occur, the notch plate must be decelerated almost instantaneously to match the speed of the pocket plate or the pocket plate must be almost instantaneously accelerated to match the speed of the notch plate. This very rapid change in speed occurring at the instant of engagement can, under some conditions, be perceived as an audible click or perturbation of the motion of the shafts attached to the MD. This occasional click occurring at the instant of engagement can be especially objectionable when one of the plates of the MD is attached to a stationary drive line element, such as an automotive transmission case.

The present invention provides one-way drive devices which are intended to reduce or eliminate the foregoing problems in a heretofore unseen way and which provides still further advantages.

SUMMARY OF THE INVENTION

As will be described in more detail hereinafter, there is disclosed herein a one-way drive device designed in accordance with one aspect of the present invention and including a first, drive member rotatable about an axis in both a drive direction and an opposite, overrun direction. The one-way drive device also includes a second, driven member rotatable about the axis in at least a driven direction. The one-way drive device further includes a coupling arrangement including at least one strut cooperating with the first and second members such that the first member is able to drive the second member in the driven direction by causing the strut to initially engage and remain engaged between the first and second members during the time the first member drives the second member. In addition, the coupling arrangement includes a cushioning arrangement for cushioning the initial engagement of the strut between the first and second members.

In another aspect of the invention, an associated method of operating a one-way drive device, as described above, is disclosed. The method includes the steps of providing a first, drive member rotatable about an axis in both a drive direction and an opposite, overrun direction and providing a second, driven member rotatable about the axis in at least a driven direction. The method further includes the step of driving the second member in the driven direction using the first member by causing a strut to initially engage and remain engaged between the first and second members during the time the first member drives the second member. The method also includes the step of cushioning the initial engagement of the strut between the first and second members.

BRIEF DESCRIPTION OF THE DRAWINGS

The present invention may be understood by reference to the following detailed description taken in conjunction with the drawings briefly described below.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
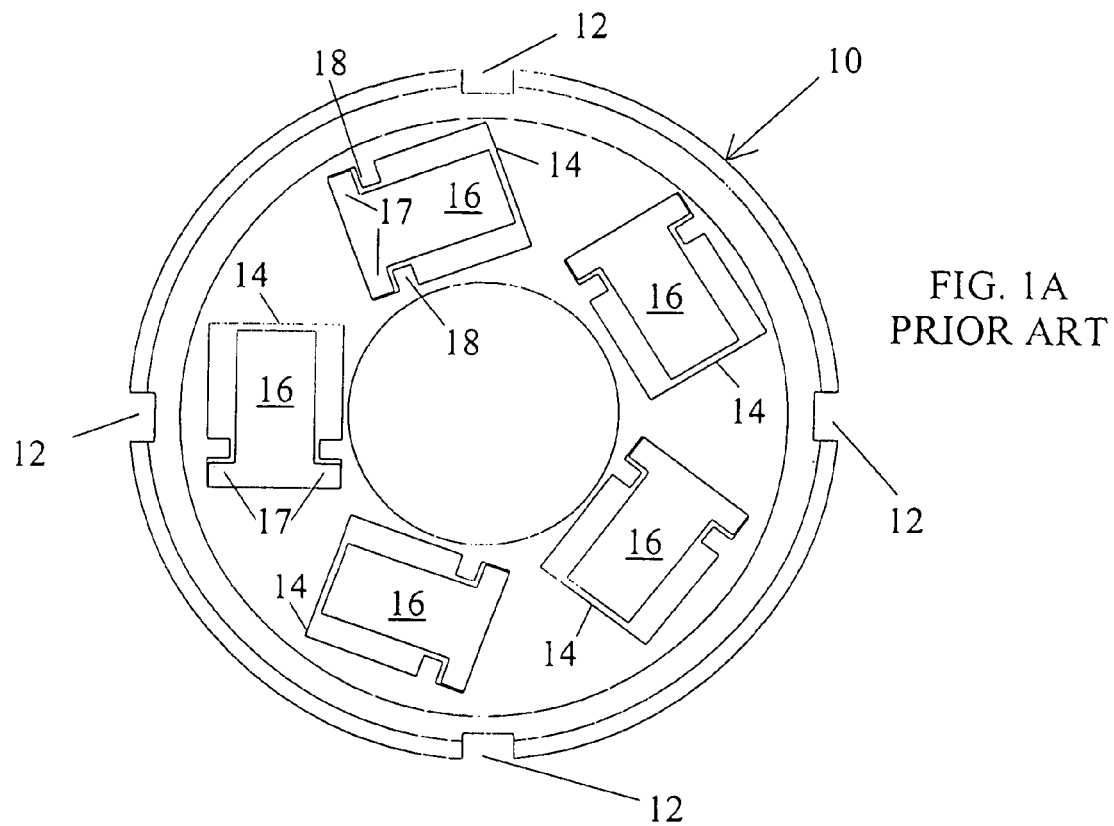
FIG. 1A is a diagrammatic illustration of a pocket plate, which is a part of a Pires-type MD mechanism.
Figure 2A:
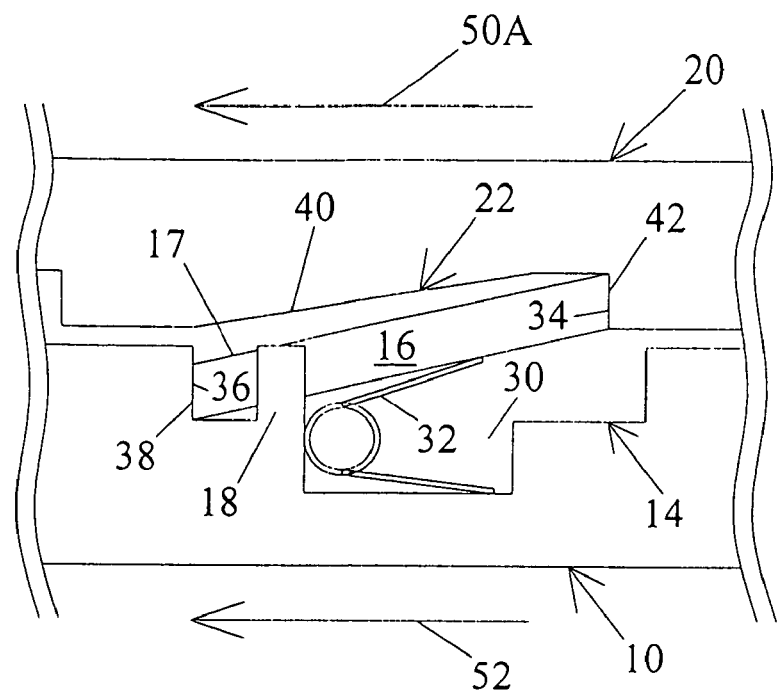
FIG. 2A is a partial, enlarged cross-sectional view of a Pires-type MD mechanism, shown here to illustrate details of the Pires-type MD mechanism in driving mode.
Figure 2B:
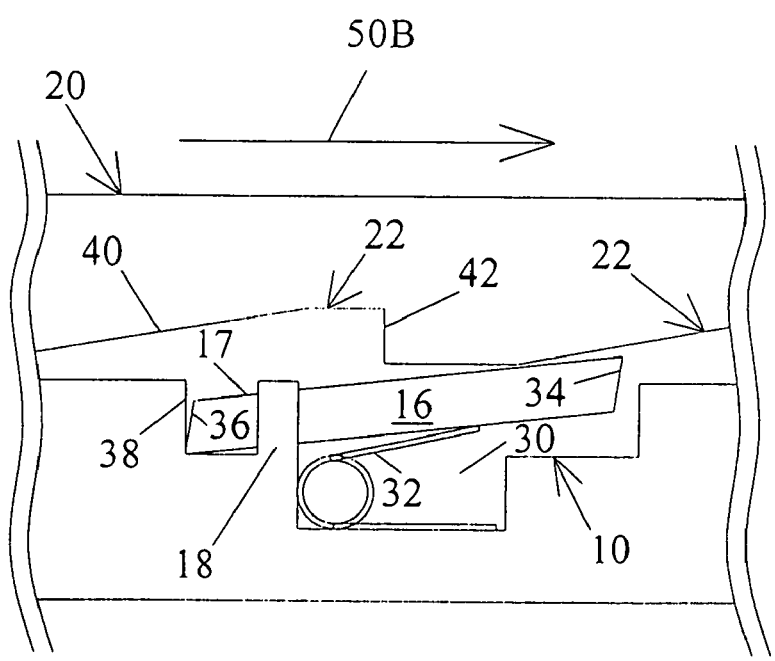
FIG. 2B is a partial, enlarged cross-sectional view of a Pires-type MD mechanism, shown here to illustrate details of the Pires-type MD mechanism in overrunning mode.
Figure 3:
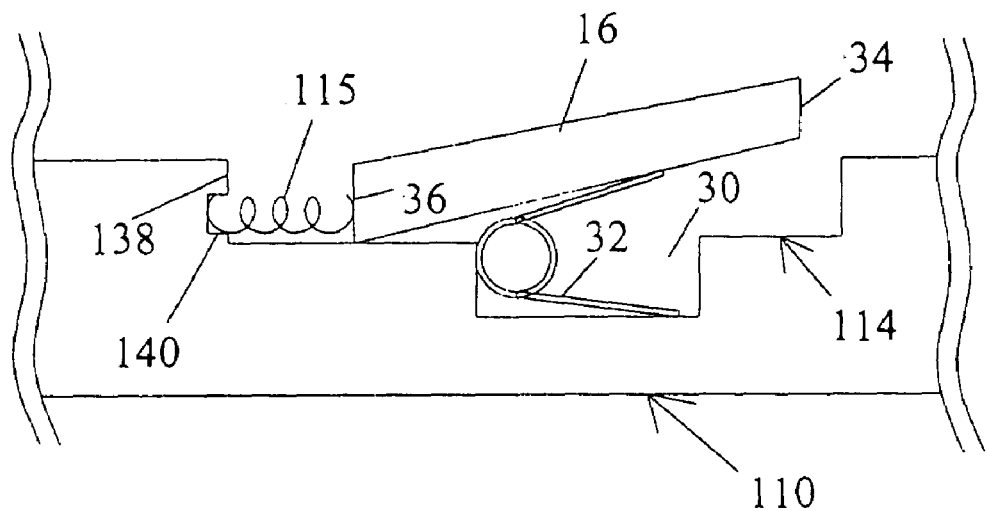
FIG. 3 is a partial, enlarged cross-sectional view of a first embodiment of a pocket plate for a one-way drive device, shown here to illustrate details of a strut cushioning mechanism designed in accordance with the present invention.

Attention is directed to FIG. 3, in which a pocket plate 110 and strut configuration of the one-way drive device of the present invention is described. As will be described in detail immediately hereinafter, the present invention is a modification of the aforedescribed MD for reducing the engagement impact of the strut, which engagement impact can cause an audible or sensible perturbation in the one-way drive device operation. Like pocket plate 10 of FIGS. 1A, 2A and 2B, pocket plate 110 includes strut 16 with first edge 34, which is biased toward potential engagement with a notch plate (not shown) by bias spring 32 housed in well 30. Pocket plate 110 also includes an extended pocket 114 for accommodating a cushioning spring 115 between second edge 36 of strut 16 and a load bearing surface 138 of extended pocket 114. When the one-way drive device of the present invention is in the overrunning mode, cushioning spring 115 keeps second edge 36 of strut 16 in a position as far from load bearing surface 138 as allowed by the spring force and the pocket design. In practical designs, the distance between second edge 36 and load bearing surface 138 is, for example, a distance of a few tenths of a millimeter to a few millimeters. Furthermore, extended pocket 114 includes an additional spring pocket 140, which is designed to accommodate cushioning spring 115 therein as cushioning spring 115 is compressed. That is, as cushioning spring 115 is compressed by a load applied to strut 16, cushioning spring 115 is compressed into spring pocket 140 such that at least a portion of second edge 36 of strut 16 comes in direct contact with load bearing surface 138. The operation of the strut configuration with the cushioning spring will be described in further detail immediately hereinafter.

Figure 4A:
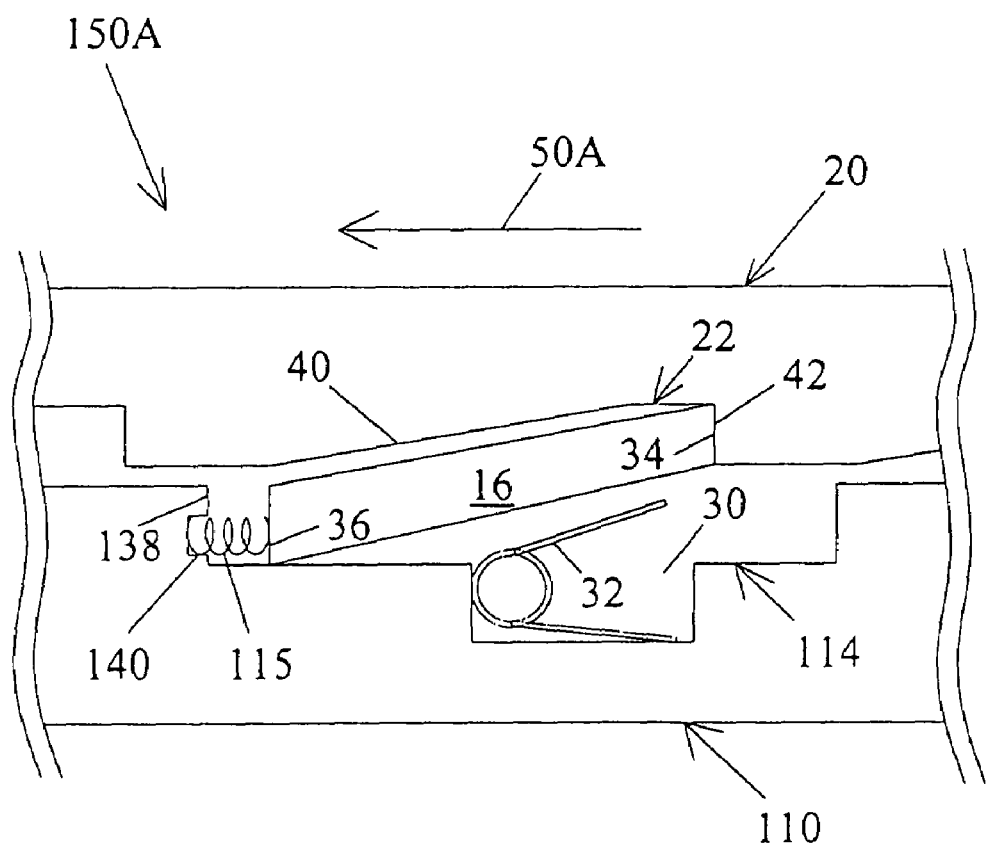
FIG. 4A is a partial, enlarged cross-sectional view of the first embodiment of a one-way drive device including the strut cushioning mechanism of the present invention, shown here to illustrate the details of the MD mechanism in driving mode in partial engagement.
Figure 4B:
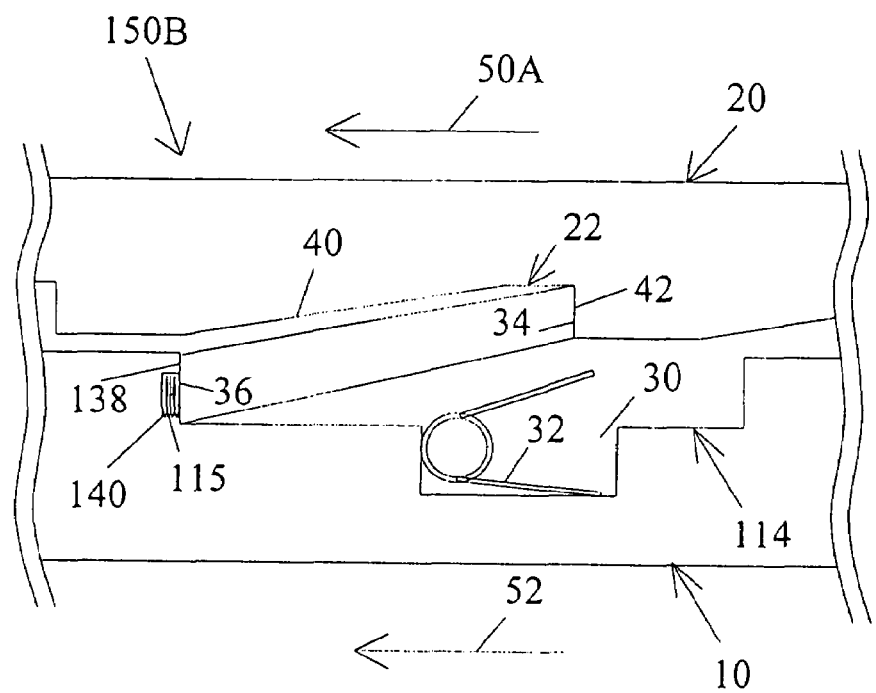
FIG. 4B is a partial, enlarged cross-sectional view of the first embodiment of the one-way drive device including the strut cushioning mechanism of the present invention, shown here to illustrate the details of the MD mechanism in driving mode in full engagement.

Turning now to FIGS. 4A and 4B, the operation of pocket plate 110 of the present invention in one embodiment of the one-way drive device in the transition from overrunning mode to the drive mode is described. FIG. 4A illustrates a partial cross-sectional view of a one-way drive device 150A including pocket plate 110 immediately after first edge 34 of strut 16 has come into initial engagement with shoulder 42 of notch plate 20. As shown in FIG. 4A, notch plate 20 is moving in the drive direction as indicated by arrow 50A. Cushioning spring 115 serves to cushion the initial engagement such that second edge 36 of strut 16 does not engage load bearing surface 138 right away. In this way, there is created a brief period of time during which the load transferred through strut 16 to pocket plate 110 is gradually increased as cushioning spring 115 is compressed, rather than an abrupt, almost instantaneous application of load from notch plate 20 to the pocket plate 110. That is, as cushioning spring 115 is compressed due to the torque transferred from notch plate 20, second edge 36 of strut 16 moves toward load bearing surface 138 until cushioning spring 115 is completely compressed. Furthermore, as cushioning spring 115 is compressed, cushioning spring 115 is accommodated into spring pocket 140 such that at least a portion of second edge 36 directly engages load bearing surface 138, as shown in FIG. 4B. When at least a portion of second edge 36 engages load bearing surface 138 with cushioning spring 115 being completely compressed (and thus tucked away into spring pocket 140), as illustrated in FIG. 4B, the load from notch plate 20 is transferred through strut 16 to pocket plate 110 and pocket plate 110 moves in the driven direction of arrow 52. This gradual increase in load over the period of time required for the cushioning spring to become fully compressed such that first edge 34 is engaged in shoulder 42 simultaneously with second edge 36 being engaged with load bearing surface 138 greatly reduces or eliminates entirely the noise and abruptness of the initial engagement present in previous one-way drive devices.

Figure 1B:
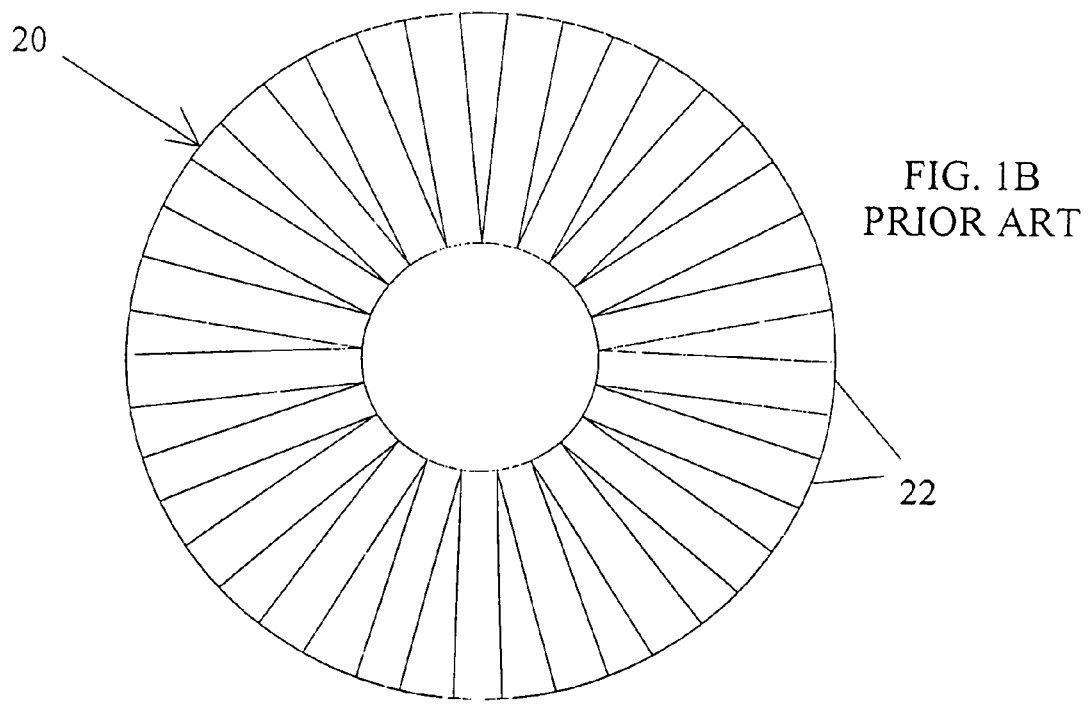
FIG. 1B is a diagrammatic illustration of a notch plate, which is another part of a Pires-type MD mechanism.
Figure 5A:
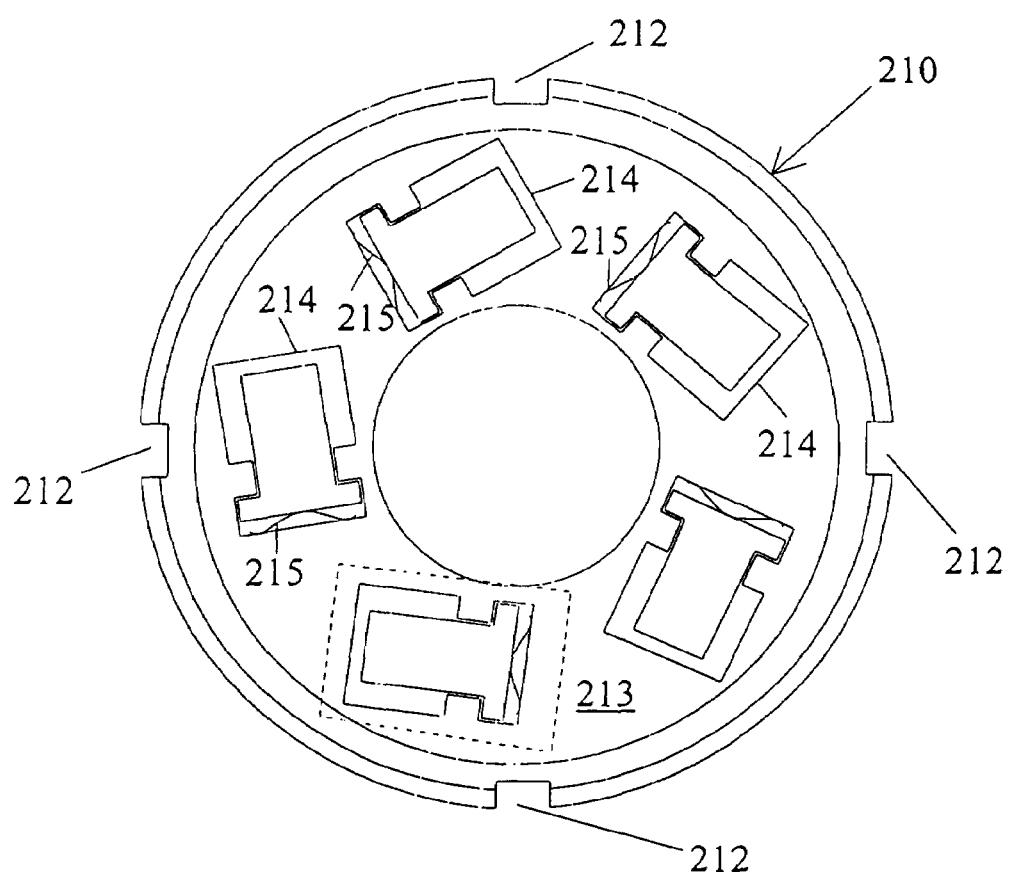
FIG. 5A is a diagrammatic illustration of a pocket plate for a one-way drive device, shown here to illustrate an arrangement of struts with an alternative strut cushioning mechanism of the present invention.
Figure 5B:
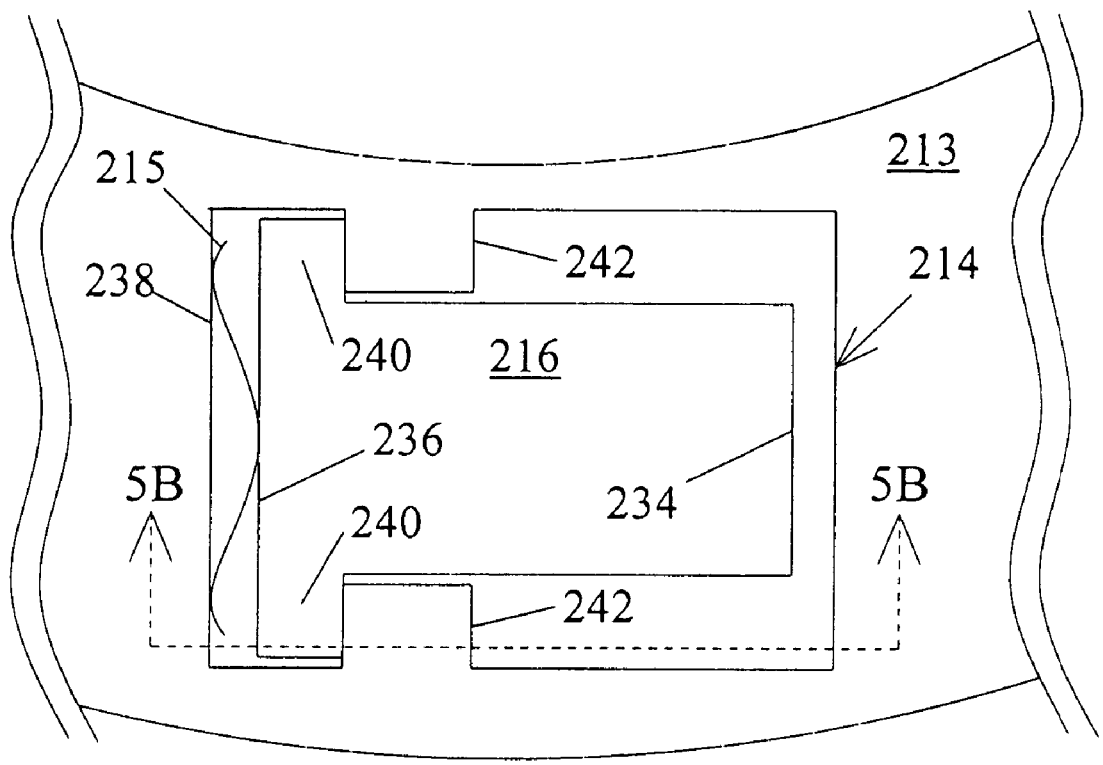
FIG. 5B is a partial, diagrammatic illustration of a second embodiment of a pocket plate for a one-way drive device, shown here to illustrate details of the alternative strut cushioning mechanism designed in accordance with the present invention.
Figure 5C:
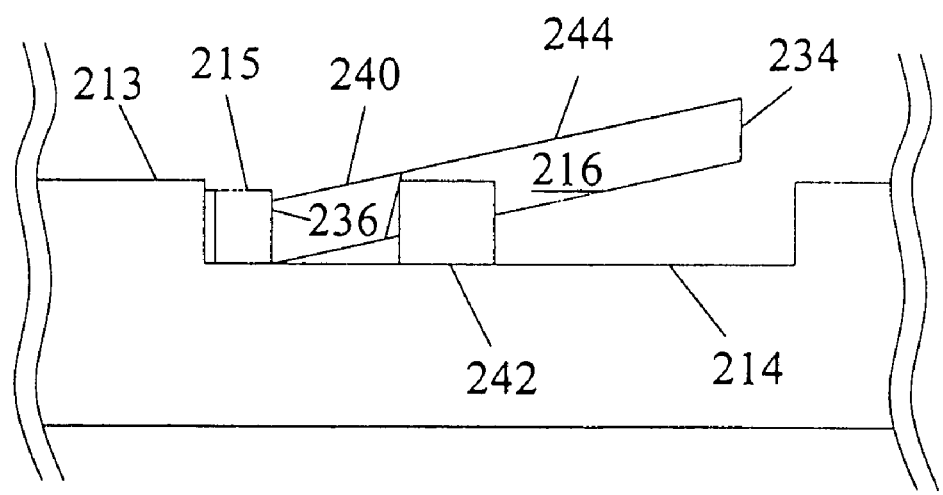
FIG. 5C is a partial, cross-sectional view of the second embodiment of the pocket plate for a one-way drive device, shown here to illustrate the strut biasing effect of the alternative strut cushioning mechanism of the present invention.

Attention is now directed to FIGS. 5A–5C, which illustrate an alternative strut and cushioning spring arrangement of the present invention. An alternative pocket plate 210 is shown in FIG. 5A. Pocket plate 210 includes a plurality of indentations 212 for coupling out (or in) of torque to an external shaft (not shown). Alternatively, splines such as those commonly known in the prior art, can be used for the same purpose. Pocket plate 210 further includes a coupling face 213, which will face a notch plate (not shown) in the same manner as the aforedescribed one-way drive devices and includes a plurality of pockets 214. Each one of pockets 214 is configured to accommodate a cushioning spring 215 and a shaped strut 216. Pockets 214 are arranged around pocket plate 210 so as to be compatible with a notch plate, such as notch plate 20 shown in FIG. 1B, in a one-way drive device configuration. Cushioning spring 215 in this embodiment is a leaf spring such that, under full load, the compressed spring lays flat between the strut and the pocket such that the load is evenly transferred through the strut to the pocket plate without the need for a spring pocket, as will be described in detail immediately hereinafter.

Details of one of pockets 214 are illustrated in FIG. 5B. As can be seen in FIG. 5B, strut 216 includes a first edge 234, which is configured to engage, for example, shoulder 42 of notch plate 20 of FIG. 1B. Strut 216 further includes a second edge 236, which is designed to indirectly engage a load bearing surface 238 of pocket 214 through cushioning spring 215 when cushioning spring 215 is completely compressed. As earlier noted, cushioning spring 215 is a leaf spring designed to lie flat against load bearing surface 238 of pocket 214 when compressed such that, when strut 216 is engaged between the notch plate and the pocket plate, the load is evenly transferred through the strut between the notch plate and the pocket plate. That is, the use of the leaf spring as cushioning spring 215 eliminates the need for a spring pocket because the leaf spring itself flattens into a good load bearing surface when a load is applied. Strut 216 also includes a pair of ears 240 along second edge 236. Ears 240 are designed to cooperate with cushioning spring 215 and a pair of strut locating shoulders 242 of pocket 214 such that cushioning spring 215 pushes ears 240 against strut locating shoulders 242. A spring pocket may alternatively be included in the design of pocket 214 or strut 216, if so desired, although is not considered to be necessary when a leaf spring is used as the cushioning spring.

Referring to FIG. 5C in conjunction with FIG. 5B, further details of the relationship between the cushioning spring, strut and strut locating shoulders are described. Second edge 236 of strut 216 is designed such that the second edge is cut at an obtuse angle with respect to a top surface 244 of strut 216. Therefore, the spring force from cushioning spring 215 is applied to the lower portion of strut 216, as shown in FIG. 5C. Similarly, ears 240 are shaped such that strut locating shoulders 242 contact the upper portion of ears 240 when the spring force of cushioning spring 215 pushes strut 216 to the right, as shown in FIG. 5C. As a result, the combined forces from cushioning spring 215 and strut locating shoulders 242 create a moment on the strut to rotate first edge 234 of the strut to rotate toward engagement with a notch plate (or upward in FIG. 5C). In this way, cushioning spring 215 can serve to cushion the initial engagement of the strut with a notch plate as well as bias the strut toward engagement with the notch plate, thus eliminating the need for a separate, bias spring as required in previous embodiments of the one-way drive device. The elimination of the bias spring is significant because of a reduction in the number of parts required as well a simplification in the pocket design.

Although each of the aforedescribed embodiments have been illustrated with various components having particular respective orientations, it should be understood that the present invention may take on a variety of specific configurations with the various components being located in a wide variety of positions and mutual orientations and still remain within the spirit and scope of the present invention. Furthermore, suitable equivalents may be used in place of or in addition to the various components, the function and use of such substitute or additional components being held to be familiar to those skilled in the art and are therefore regarded as falling within the scope of the present invention. For example, rather than the notch plate driving the pocket plate, as illustrated in FIGS. 4A and 4B, the pocket plate can be used to drive the notch plate, in which case the cushioning spring will still act to cushion the initial engagement of the strut. Also, in the embodiment illustrated in FIGS. 3, 4A and 4B, the spring pocket for accommodating the cushioning spring can be formed in the strut itself rather than in the strut pocket. In addition, the spring constant and initial load of the cushioning spring can be adjusted to accommodate the anticipated drive loads and distances between engagement opportunities of a particular pocket plate and notch plate configuration. It is anticipated, however, that the spring constant and initial load need not be precisely determined because the load carrying ability of the one-way drive device is not altered by the addition of the cushioning spring and, potentially, a slight modification of the strut surfaces. Therefore, any value of spring properties which sufficiently reduce the clicking noise or engagement abruptness are considered acceptable in the present application. Also, the exact positioning and configuration of the cushioning spring can be modified from the configurations shown in FIGS. 3–5B as long as the cushioning configuration accomplishes the desired goal of cushioning the initial engagement of the strut with the notch plate. For example, a ferrous or non-ferrous metal spring, a polymer spring, a piece of rubber material, a liquid or a gas can be used instead of the aforedescribed coil or leaf spring, and the cushioning arrangement can be positioned elsewhere in the one-way drive device, such as in the notches of the notch plate rather than in the pockets of the pocket plate. Therefore, the present examples are to be considered as illustrative and not restrictive, and the invention is not to be limited to the details given herein but may be modified within the scope of the appended claims.

What is claimed is:

1. A drive device comprising:
   a first member rotatable about an axis at least in a drive direction, said first member including a first recess defining a first shoulder and a generally planar first face normal to the axis and including said first recess;
   a second member rotatable about the axis in at least said drive direction and being positioned in close proximity to the first member, said second member including a second recess defining a second shoulder, and the second member including a generally planar second face positioned in close proximity to and in confronting relationship with the first face and including the second recess; and
   a coupling arrangement including
      at least one strut having a first end surface for direct engagement with said first shoulder and a second end surface for engagement with said second shoulder and supported by said second member for pivotal movement between an engaged position and an overrun position, based on rotation of the first member in relation to the second member, such that (i) said first member drives said second member in a drive mode with said strut engaging the first shoulder in said engaged position and (ii) the first and second members can overrun with respect to one another in an overrun mode with said strut in the overrun position, and
      a cushioning member disposed within said second recess and between said second end surface and said second shoulder for cushioning each initial engagement of the strut with the second shoulder when entering the drive mode.

2. The drive device of claim 1 wherein said cushioning member is configured such that said cushioning member is compressible to effectively act as a part of said second end surface in said drive mode.

3. The drive device of claim 1 wherein said cushioning member is a coil spring.

4. The drive device of claim 1 wherein said cushioning member is a leaf spring.

5. The drive device of claim 1 wherein said strut is configured to cooperate with said first member such that a given load is transferable from said first member to said second member via said strut, and wherein said cushioning member is configured such that said given load is gradually transferred from said first member to said second member over a given period of time from each initial engagement in said drive mode.

6. A drive device comprising:
   a first member rotatable about an axis at least in a drive direction, said first member including a first recess defining a first shoulder;
   a second member rotatable about the axis in at least said drive direction and being positioned in close proximity to the first member, said second member including a second recess defining a second shoulder; and
   a coupling arrangement including
      at least one strut having a first end surface for direct engagement with said first shoulder and a second end surface for engagement with said second shoulder and supported by said second member for pivotal movement between an engaged position and an overrun position, based on rotation of the first member in relation to the second member, such that (i) said first member drives said second member in a drive mode with said strut engaging the first shoulder in said engaged position and (ii) the first and second members can overrun with respect to one another in an overrun mode with said strut in the overrun position, and
      a cushioning member disposed within said second recess and between said second end surface and said second shoulder for cushioning each initial engagement of the strut with the second shoulder when entering the drive mode, wherein said cushioning member is further configured for biasing said strut for engagement of said first end surface with said first shoulder.

7. In a drive device including a first member rotatable about an axis in at least a drive direction and including a first recess defining a first shoulder and a generally planar first face normal to the axis and including said first recess, said drive device further including a second member rotatable about the axis in at least a driven direction and being positioned in close proximity to the first member, said second member including a second recess defining a second shoulder including a generally planar load bearing surface positioned in close proximity to and in confronting relationship with the first face and including the second recess, and said drive device also including a coupling arrangement including at least one strut having a first edge configured for direct engagement with said first shoulder and a second edge for engagement with said second shoulder, said strut being supported by said second member for pivotal movement between an engaged position and an overrun position, based on rotation of the first member in relation to the second member, such that (i) said first member drives said second member in a drive mode with said strut engaging the first shoulder in said engaged position and (ii) the first and second member can overrun with respect to one another in an overrun mode with said strut in the overrun position, a method for operating said drive device comprising:
   providing a cushioning member within said second recess and between said second edge of said strut and said second shoulder of said second member such that said second edge indirectly engages said load bearing surface through said cushioning member, thus cushioning each initial engagement of the strut with the second shoulder when entering the drive mode.

8. The method of claim 7 wherein said first member indirectly applies a driving force along a path from said first shoulder through said strut to said load bearing surface in said second shoulder of said second member, said method further comprising:
   disposing said cushioning member within said path of said driving force such that said driving force is applied also through said cushioning member so as to drive the second member in said drive mode.

9. The method of claim 7 further comprising:
configuring said cushioning member to be compressible to effectively act as a part of said second edge in said drive mode.

10. The method of claim 7 further comprising:
providing a coil spring as the cushioning member within said second recess and cushioning each initial engagement of the strut and the second shoulder with the coil spring when entering the drive mode.

11. The method of claim 7 further comprising:
providing a leaf spring as the cushioning member within said second recess and cushioning each initial engagement of the strut and the second shoulder with the leaf spring when entering the drive mode.

12. The method of claim 7 further comprising:
configuring the strut to cooperate with said first member such that a given load is transferable from said first member to said second member via said strut, and wherein said cushioning member is configured such that said given load is gradually transferred from said first member to said second member over a given period of time from each initial engagement in said drive mode.

13. In a drive device including a first member rotatable about an axis in at least a drive direction and including a first recess defining a first shoulder, said drive device further including a second member rotatable about the axis in at least a driven direction and being position in close proximity to the first member, said second member including a second recess defining a second shoulder including a load bearing surface, and said drive device also including a coupling arrangement including at least one strut having a first edge configured for direct engagement with said first shoulder and a second edge for engagement with said second shoulder, said strut being supported by said second member for pivotal movement between an engaged position and an overrun position, based on rotation of the first member in relation to the second member, such that (i) said first member drives said second member in a drive mode with said strut engaging the first shoulder in said engaged position and (ii) the first and second member can overrun with respect to one another in an overrun mode with said strut in the overrun position, a for operating said drive device comprising:

providing a cushioning member within said second recess and between said second edge of said strut and said second shoulder of said second member such that said second edge indirectly engages said load bearing surface through said cushioning member, thus cushioning each initial engagement of the strut with the second shoulder when entering the drive mode; and configuring said cushioning member to bias said strut for engagement of said first edge with said first shoulder.

* * * * *